March 15, 1966  C. JONES  3,240,174
PLANTING APPARATUS FOR FARM TRACTORS
Filed July 15, 1963  5 Sheets-Sheet 1
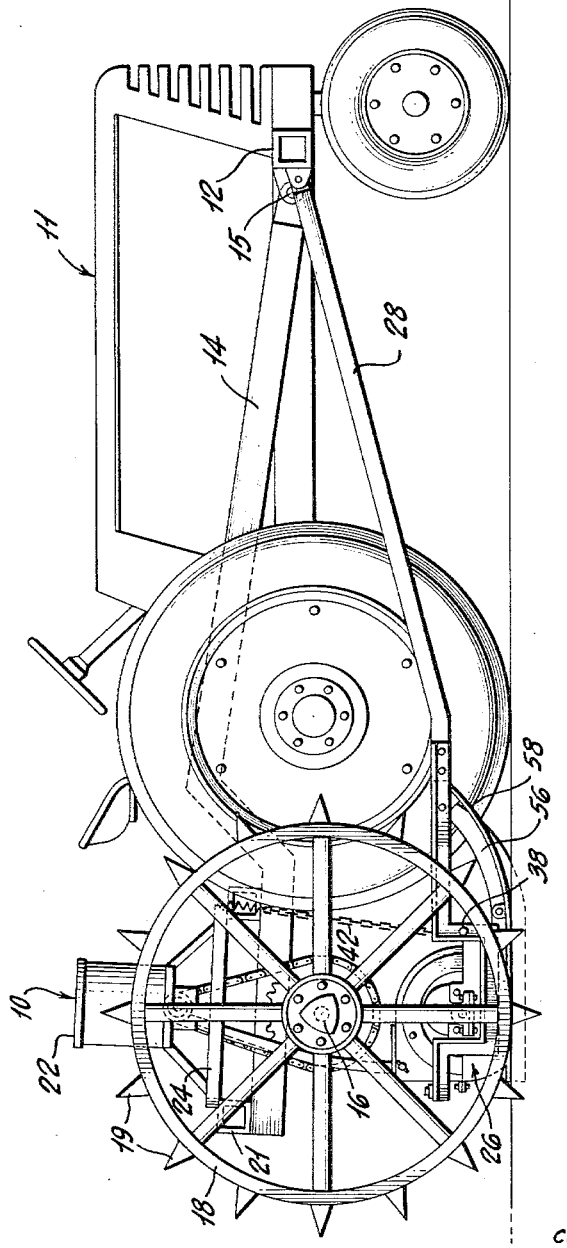
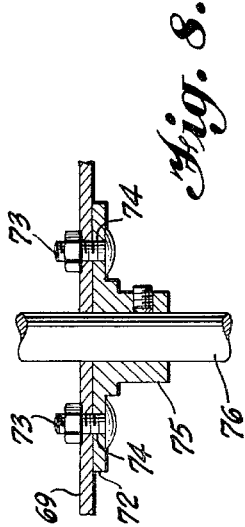
INVENTOR
CLEVELAND JONES, DECEASED,
BY CAROLYN STAPLES JONES, EXECUTRIX
BY
*Burns, Doane, Benedict, Swecker & Mathis*
ATTORNEYS March 15, 1966  C. JONES  3,240,174
PLANTING APPARATUS FOR FARM TRACTORS
Filed July 15, 1963  5 Sheets-Sheet 2
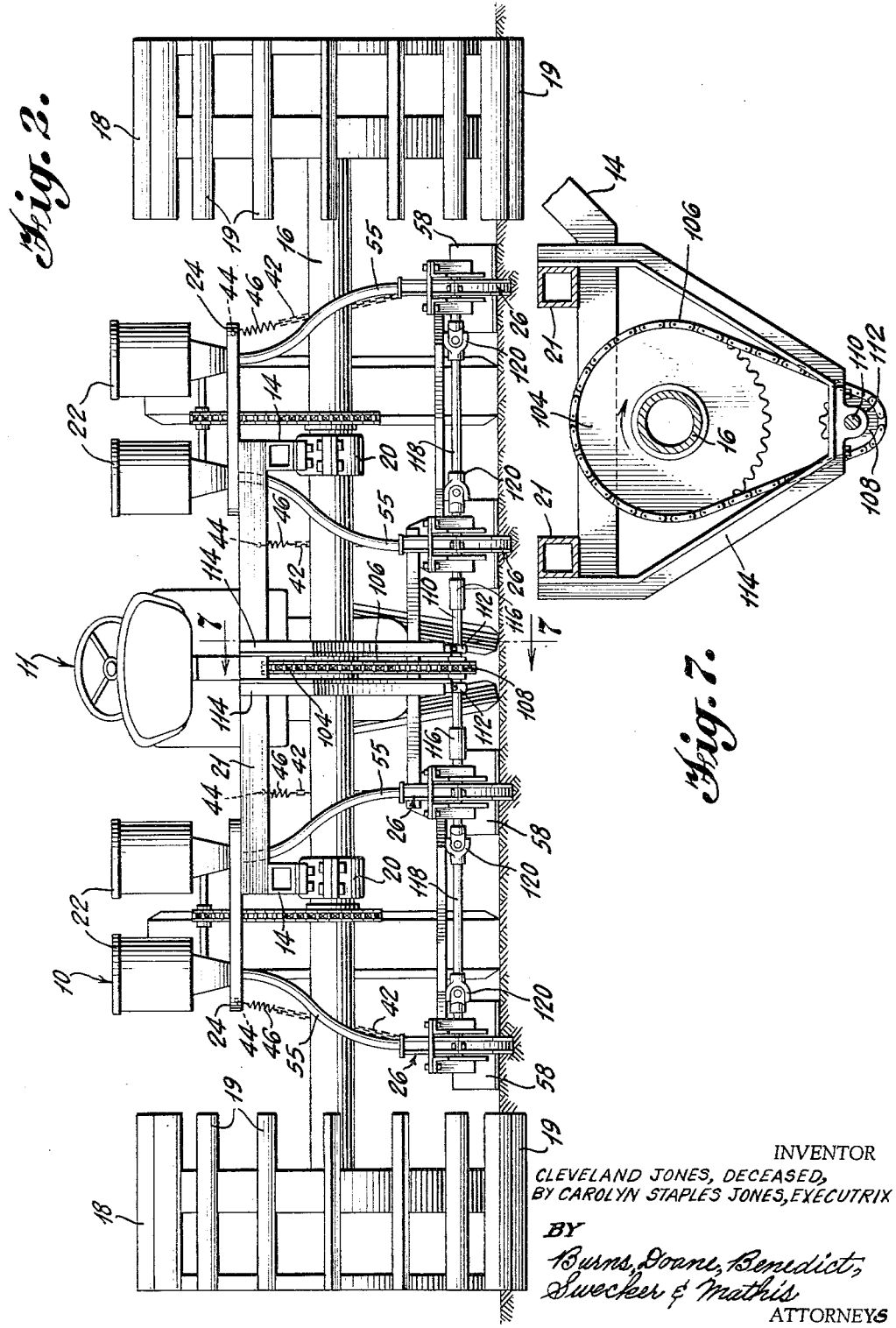
INVENTOR
CLEVELAND JONES, DECEASED,
BY CAROLYN STAPLES JONES, EXECUTRIX
BY
Burns, Doane, Benedict,
Swecker & Mathis
ATTORNEYS

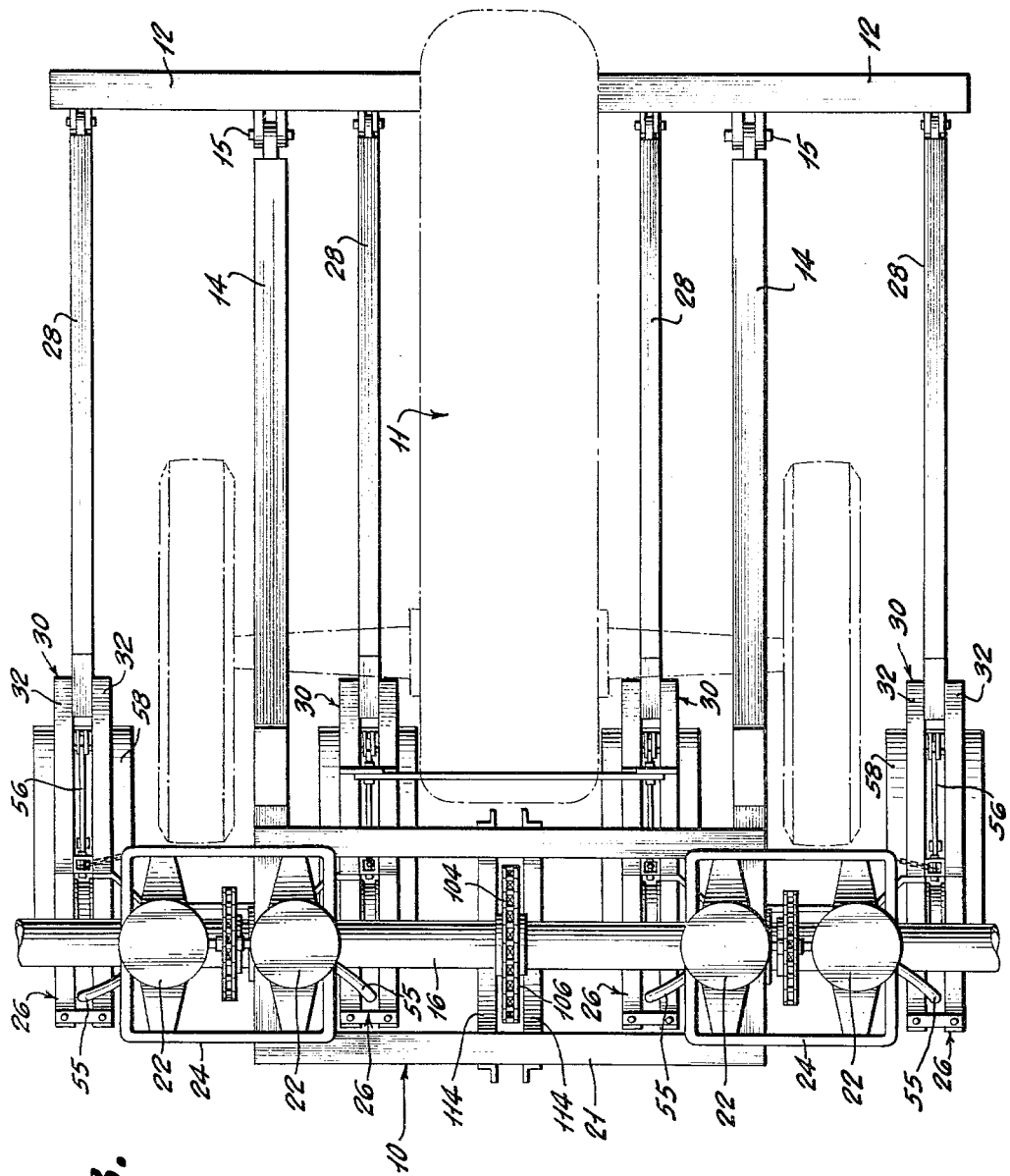

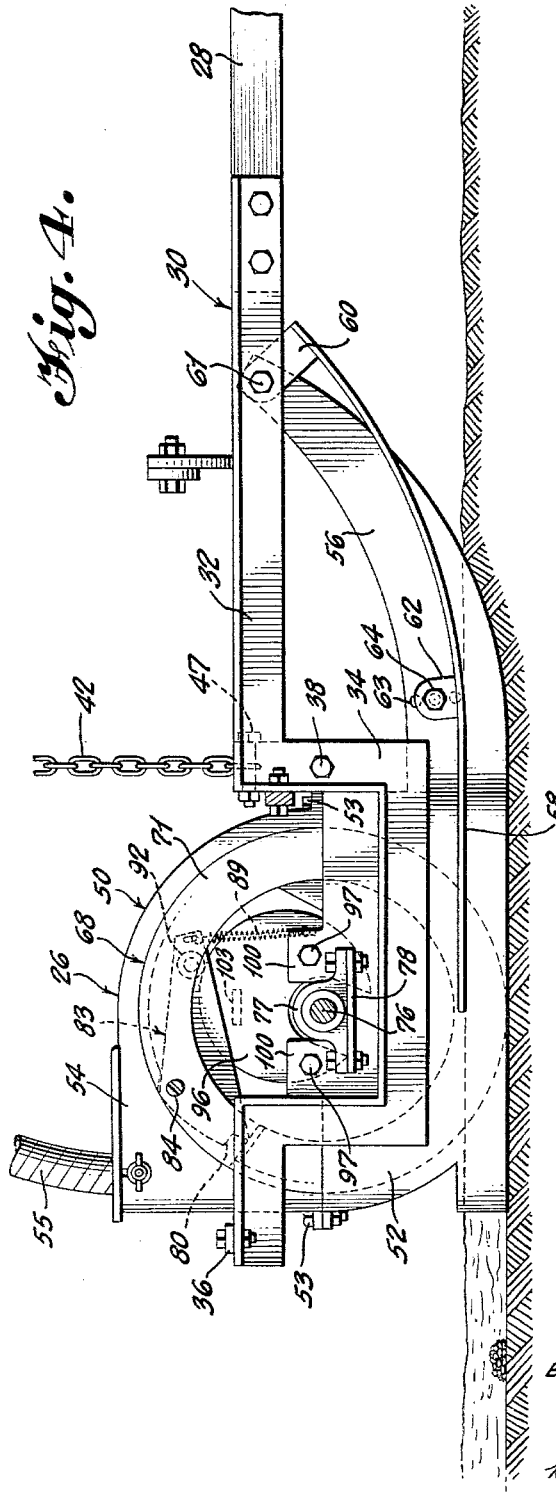

March 15, 1966
C. JONES
3,240,174
PLANTING APPARATUS FOR FARM TRACTORS
Filed July 15, 1963
5 Sheets-Sheet 5
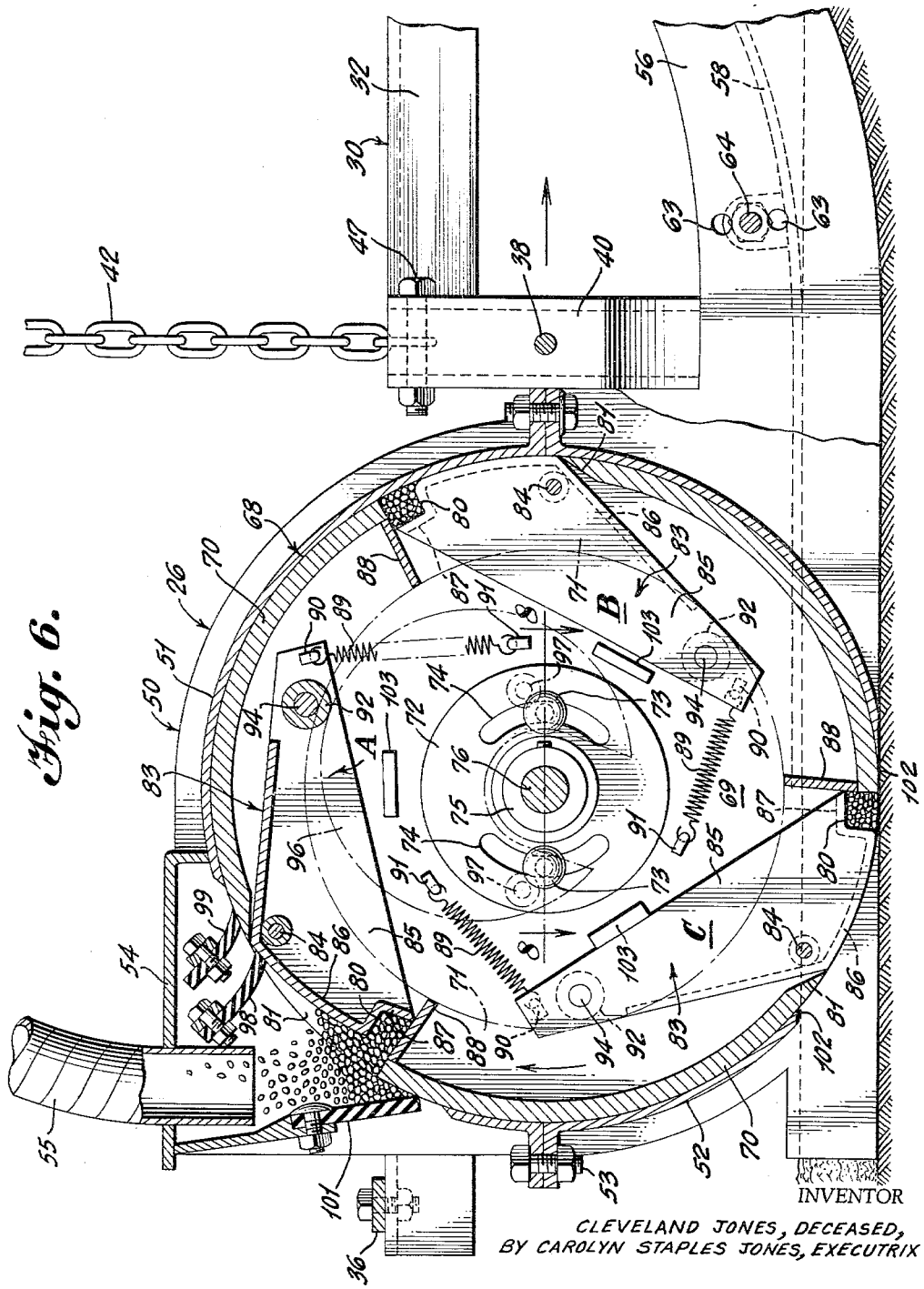
INVENTOR
CLEVELAND JONES, DECEASED,
BY CAROLYN STAPLES JONES, EXECUTRIX
BY
Burns, Doane, Benedict, Swecker & Mathis
ATTORNEYS United States Patent Office 3,240,174
Patented Mar. 15, 1966

3,240,174
PLANTING APPARATUS FOR FARM TRACTORS
Cleveland Jones, deceased, late of Inverness, Miss., by Carolyn Staples Jones, executrix, Inverness, Miss.
Filed July 15, 1963, Ser. No. 295,619
5 Claims. (Cl. 111—36)

This invention relates to a planting apparatus for farm tractors, and more specifically to an attachment for farm type tractors including means for planting seeds along a plurality of rows at predetermined depths, and uniformly spaced and aligned in both longitudinal and lateral directions so as to enable cross plowing of the crop transversely of the direction of travel of the planter.

Currently the high cost of labor and the highly competitive market for farm produce make it necessary that such produce be raised and harvested in the most economic fashion possible to provide a profit to the grower. With the abundancy of mechanized units for various farming operations, large scale farming has become possible without a substantial increase in labor costs. However, in certain areas of farming, some operations must still be performed manually due to the inadequacy of machinery to function in a field when the crop is in a semimature stage.

This is especially true of crops such as cotton wherein the cotton plants are planted in individual hills, and during the growing season, weeds must be removed to permit the cotton plants to flourish abundantly. Also the fields should be kept free from weeds so that when the cotton is picked by machines, the machine will not gather weeds with the cotton.

Many endeavors have been made to mechanize the planting of cotton in various ways to obtain the best results and to provide for easy handling of the plants during the growing period. Many such devices are subject to disadvantages, such as improper positioning of the seeds, thereby prohibiting cross plowing of the cotton field during the growing season of the cotton plant, thus making it necessary to weed manually the cotton field.

If the plants are aligned both laterally and longitudinally, a tractor drawn apparatus may be used to remove weeds from the field by driving the tratcor longitudinally of the cotton rows and also laterally of the cotton rows. Further, many of the existing devices waste seeds, or do not deposit the required number of seeds in each hill, or even at times fail to deposit any seeds.

It is, therefore, an object of this invention to overcome the disadvantages enumerated above.

It is another object of this invention to provide planting apparatus having means for planting seeds in predetermined uniform rows, aligned in both longitudinal ad lateral directions.

It is still a further object of this invention to provide seed planters which are adapted to receive a predetermined number of seeds and to deposit all of the seeds in a predetermined spaced relation.

This and other objects of the invention may be accomplished according to one embodiment, wherein the apparatus comprises a frame adapted, at one end, to be connected to a tractor and to be drawn thereby, including a pair of ground engaging wheels to support the free end of the frame. Seed planters are secured to the frame by means which permits vertical movement of the seed planters as the frame is drawn over the ground by the tractor. Seed hoppers are supported on the frame and connected to the seed planters. The seed planters are provided with a plurality of pockets which are constructed to assure reception of a predetermined number of seeds, and to eject all of the seeds in the pocket at the proper time.

This embodiment is illustrated in the accompanying drawings wherein:

FIG. 1 is a side elevational view of the planting apparatus secured to a farm type tractor;
FIG. 2 is a rear elevational view thereof;
FIG. 3 is a top plan view thereof;
FIG. 4 is a side elevational view of one of the seed planters and supporting means;
FIG. 5 is a top plan view thereof;
FIG. 6 is a side sectional view of one of the seed planters;
FIG. 7 is a partial sectional view taken on line 7—7 of FIG. 2; and
FIG. 8 is a partial sectional view of the connection of the wheel of the seed planter to the drive shaft.

The planter apparatus 10 is adapted to be secured to a conventional farm tractor 11 by a beam 12, extending transversely of the tractor, which is rigidly secured to the forward portion of the tractor.

A pair of beams 14 are pivotally connected to the transverse beam 12 at 15 by suitable means. The beams 14 extend longitudinally of the tractor and rearwardly thereof. The beams 14 are supported at their other ends on an axle 16, having ground engaging wheels 18 mounted on each end thereof. The wheels 18 may be provided with lugs 19, if so desired, to improve traction of the wheels with the ground. The axle 16 is journaled in bearings 20, secured to the bottom of the beams 14.

A rigid frame 21 extends between and is connected to the beams 14 at each end thereof by suitable means such as welding. The frame 21 is illustrated as formed in a rectangular shape but may be of any shape as desired. Seed hoppers 22 are supported on the frame 21 by suitable mounts 24. The seed hoppers 22 are of conventional structure and it is therefore not considered necessary to set forth the details of the structure of the seed hoppers.

In the illustrated embodiment of the invention, two seed hoppers 22 are supported on each mount 24; however, the number of seed hoppers may be varied depending on the number of seed planters utilized. A seed planter 26 is supported on a beam 28 which is pivotally connected at one end thereof to the transverse beam 12 and which extends longitudinally of the tractor 11. In the illustrated embodiment, there are four beams 28 and four seed planters 26. The number of seed planters may be varied as desired.

Each seed planter 26 is connected to a beam 28 by support means 30 secured to the free end of the beam 28. This structure can best be seen in FIGS. 4 and 5 of the drawings. The support means 30 comprises a pair of bars 32 removably attached at their one ends to opposite sides of the beam 28 by suitable means such as bolts. The bars 32 extend rearwardly therefrom in spaced parallel relationship and are formed with a substantially U-shaped portion 34. The bars 32 are connected together at their other ends by a link 36 bolted at each end thereof to the bars 32.

A seed planter 26 is supported adjacent the portion 34 between the bars 32 and is pivotally connected thereto by a bolt 38 extending between the bars 32 and through an upright column 40, secured to the seed planter.

The support means 30 and the seed planter 26 are supported by a chain 42 connected to the frame 21 at 44 by means of a spring 46, the other end of the chain being secured to the planter by a bolt 47 extending through the column 40, which is illustrated as a hollow member. The chain 42 may be secured to the planter 26 by other suitable means, if so desired.

In this manner, the support means 30, with the planter 26 mounted thereon, is free to move in a vertical direction about the pivotal connection of the beam 28 to the transverse beam 12. Also, the planter 26 is capable of some pivotal movement about its connection 38 to the support means 30. In this manner, any uneven terrain encountered by a seed planter 26 is accommodated for without interfering with the operation of the planter or damaging any mechanism thereof.

Each seed planter 26 includes a housing 50 formed of an upper member 51 and a lower member 52 detachably secured together by bolts 53 or other suitable means. Each member 51 and 52 is formed in a substantially semi-cylindrical shape.

The upper member 50 is provided with a receiving chamber 54 communicating with a seed hopper 22 by a flexible conduit 55 to receive seeds therefrom.

The lower member 52 is provided with a plow 56, as best seen in FIGS. 4, 5 and 6. The plow 56 is illustrated as an integral portion of the member 52; however, it may be a separate element and rigidly secured thereto by suitable means. The plow 56 is adapted to penetrate the ground and to form a furrow for planting the seeds. A skid 58 is provided to control the depth to which the plow penetrates the ground. The skid 58 is connected to the plow at its one end by a tab 60 rigidly secured thereto and connected to the plow by a bolt 61. A further tab 62 is provided substantially midway of the skid 58 and secured rigidly thereto. A plurality of apertures 63 may be provided for adjustably securing the skid 58 to the plow 56 by means of a bolt 64 to vary the depth to which the plow may penetrate the ground. The bolt 61 may be loosened and the skid pivoted about the bolt 61 to position the bolt 64 in any one of the apertures 63, as desired.

A wheel 68 is rotatably mounted within the housing 50. The wheel 68 comprises a circular plate 69 mounted within the housing 50 adjacent one side thereof. The plate 69 is provided with a rim 70 of substantially the same width as the interior width of the housing 50. A circular flange 71 is secured to the rim 70 at the edge opposite the plate 69 and parallel to the plate 69. The plate 69 is secured to a disc 72 by a pair of bolts 73 extending through arcuate slots 74 in the disc. The slots 74 permit adjustment of the position of the plate 69 relative to the disc 72 for reasons which will be described below. The disc 72 includes a hub 75 for supporting the disc on a drive shaft 76 extending through the housing 50. The drive shaft 76 is journaled in bearings 77 mounted on each side of the housing 50 on laterally extending plates 78 which are rigidly secured to the housing. In this manner, the wheel 68 is rotatable within the housing 50.

A plurality of seed pockets 80 are provided in the wheel 68 and are adapted to receive a predetermined number of seeds from the chamber 54 and deposit the seeds in the ground. The rim 70 is provided with a plurality of circumferentially spaced openings 81. Each of the pockets 80 is formed in part by a member 83 pivotally mounted on the plate 69 at 84. The member 83 includes a pair of spaced side walls 85 disposed in planes perpendicular to the rotational axis of the wheel 68. A wall 86 extends between the spaced walls 85 to secure them together. A portion of the wall 86 is adapted to be disposed in an opening 81 and is formed with a detent portion 87. Adjacent one end of each opening 81 is a flange 88 extending radially inwardly from the rim 70.

It can thus be understood that the bottom wall and end walls of the pockets 80 are formed by the detent portion 87 and the flange 88. The side walls of the pockets 80 are formed by the plate 69 and the flange 88.

The member 83 normally is urged against the inner surface of the peripheral wall of the housing 50 by a spring 89 secured thereto at 90. The other end of the spring 89 is connected to the plate 69 at 91.

As the wheel 68 is rotated and a seed pocket 80 approaches the seed chamber 54 in the housing 50, the member 83 is caused to pivot about its axis 84 to move the wall 86 away from the periphery of the wheel, radially inwardly of the wheel. This is accomplished, in the illustrated embodiment, by a roller 92 rotatably mounted on a pin 94 extending between the walls 85 and secured at each end thereto. The roller 92 is adapted to engage a stationary cam 96, mounted within the housing 50. The cam 96 is mounted on a pair of bolts 97 connected to ears 100 on the lower member 52 of the housing 50.

In this manner, when a seed pocket 80 is in position to receive seeds, indicated at A in FIG. 6, the seed pocket is moved radially inwardly to assure reception of a proper number of seeds. As the wheel 68 continues to rotate and a seed pocket 80 moves beyond the seed chamber 54, the roller 92 no longer engages the cam 96 and the seed pocket will be pivoted outwardly toward the peripheral wall of the housing 50 by the spring 89.

The plate 68 may be adjusted radially about the disc 72 by loosening the bolts 73 and rotating the plate and moving the bolts within the slots 74. This permits accurate adjustment of the engagement of a roller 92 with the cam 96 to determine the movement of the member 83 as it moves past the seed chamber 54.

Resilient flaps 98 and 99 are provided in the seed chamber 54 adjacent the exit of the chamber to wipe excessive seeds from a seed pocket 80. A further flexible flap 101 is provided on the chamber 54 to form the wall adjacent the entrance of the chamber 54 to assure a close seal between the wall and the rotating wheel 68 to maintain the seeds within the chamber 54 without causing undue friction as the wheel 68 rotates thereby.

As the wheel 68 continues to rotate within the housing 50, the member 83 is urged into a position where the wall 86 engages the inner peripheral wall of the housing and the seed pocket 80 holds the desired number of seed as shown in the position indicated at B in FIG. 6.

When a seed pocket 80 reaches the discharge position, indicated at C in FIG. 6, there is an opening 102 provided in the peripheral wall of the housing 50 through which seeds may drop by gravity into the furrow formed in the ground. As a seed pocket 80 passes the opening 102, the spring 89 will urge the member 83 radially outwardly until it engages a stop 103 secured to the plate 68. This will cause a jarring effect on the member 83 to assure ejection of all seed held within the seed pocket 80. In this manner, it is to be understood that each seed planter 26 receives a desired number of seeds and causes complete and accurate ejection of all seeds at the proper location.

The drive of the wheel 68 is accomplished by the ground engaging wheels 18 secured on the axle 16. As the tractor moves, it pulls the attachment therewith and the wheels 18 will rotate, thereby rotating the axle 16. A cog wheel 104 is rigidly secured to the axle 16 for rotation therewith. A chain 106 extends between the cog wheel 104 and a sprocket 108 for driving relation therewith. The sprocket 108, FIGS. 2 and 7, is secured to a drive shaft 110 which extends to either side thereof and is journaled in bearings 112. The bearings 112 are mounted on brackets 114 which are secured to the frame 21 and which extend downwardly therefrom in spaced parallel relation. Universal joints 116 connect the drive shaft 110 to a drive shaft 76 of a seed planter 26.

As stated before, the number of seed planters 26 may be varied as desired. The drive of the various seed planters 26 may be accomplished by utilizing a plurality of extension drive members 118, secured to the various drive shafts 76 of the seed planters 26 by universal joints 120.

In this manner it will be understood that the seeds are deposited in accordance with the distance the attachment is moved over the ground. The placing of the seeds is entirely independent from the speed at which the attachment is moved over the ground. The connection of the drive of the seed planters 26 to the ground engaging wheels accomplishes this result to assure positive spacing between hills of cotton.

In this manner the cotton hills are positioned in uniform rows both longitudinally and laterally of the path of movement of the tractor. This arrangement permits driving equipment through the fields in both longitudinal and lateral directions to remove weeds from between the cotton plants.

While the invention has been illustrated and described in a certain embodiment, it is recognized that other variations and changes may be made therein without departing from the invention as set forth in the claims.

What is claimed is:

1. Planting apparatus comprising a housing having a discharge opening, a seed chamber in said housing, rotary means rotatably mounted within said housing, said rotary means having at least one seed pocket therein, driving means for rotating said seed pocket of said rotary means from said seed chamber to said discharge opening whereby seeds received in said seed pocket from said seed chamber may be discharged through said discharge opening, and cam means to increase the volume of said seed pocket when it is adjacent said seed chamber to thereby facilitate loading an excessive amount of seeds therein and to subsequently decrease said volume and to thereby eject the excessive portion of seeds back into said seed chamber.

2. Planting apparatus comprising a housing having a discharge opening, a seed chamber in said housing remote from said discharge opening, said housing including a cover means on the outer periphery thereof between said seed chamber and said discharge opening, rotary means rotatably mounted within said housing, at least one movable means movably attached to said rotary means, portions of said rotary means and portions of said movable means cooperating to define a seed pocket, driving means for rotating said seed pocket from said seed chamber to said discharge opening whereby seed received in said seed pocket from said seed chamber may be discharged through said discharge opening, spring means urging said movable means into contact with said cover means during rotation of said seed pocket from said seed chamber to said discharge opening and cam means cooperating with said movable means and said spring means to increase the volume of said seed pocket when it is rotationally adjacent said seed chamber to thereby facilitate loading an excessive amount of seed therein and to subsequently decrease said volume and to thereby eject the excessive portion of seeds back into said seed chamber.

3. Planting apparatus according to claim 2 wherein flexible wiper means are provided in said seed chamber adjacent said cover means to aid in removing excess seed from said seed pocket.

4. Planting apparatus comprising a housing having a discharge opening, a seed chamber in said housing remote from said discharge opening, said housing including a cover means on the outer periphery thereof between said seed chamber and said discharge opening, rotary means rotatably mounted within said housing, said rotary means comprising a shaft rotatably mounted within said housing, a pair of end members fixedly mounted on said shaft, a plurality of pivotal members pivotally connected intermediate the length thereof between said end members, the outer end of each of said pivotal members having a recess therein forming a seed pocket for receiving seed from said seed chamber, cam follower means on the inner end of each of said pivotal members, cam means fixed in said housing, spring means urging said cam follower means into contact with said cam means and urging said outer ends of said pivotal members toward said cover means, and driving means for rotating said rotary means to move said seed pockets from said seed chamber to said discharge opening whereby seed received in said seed pockets from said seed chamber may be discharged through said discharge opening.

5. Planting apparatus according to claim 4 wherein stop means are provided on one of said end members to restrict pivotal movement of said pivotal members adjacent said discharge opening.

References Cited by the Examiner

UNITED STATES PATENTS

| 444,645 | 1/1891 | Friederich. |
| 451,761 | 5/1891 | Howland. |
| 635,094 | 10/1899 | Fender. |
| 1,035,025 | 8/1912 | Mahoney _____ 172—393 |
| 2,543,888 | 3/1951 | Bunch _____ 111—74 X |

FOREIGN PATENTS

| 245,587 | 4/1912 | Germany. |

ABRAHAM G. STONE, *Primary Examiner.*

T. GRAHAM CRAVER, WILLIAM A. SMITH, III,
*Examiners.*